(12) United States Patent
Kohut et al.

(10) Patent No.: US 9,348,829 B2
(45) Date of Patent: May 24, 2016

(54) MEDIA MANAGEMENT SYSTEM AND PROCESS

(71) Applicants: Sony Corporation, Tokyo (JP); Sony Pictures Entertainment Inc, Culver City, CA (US)

(72) Inventors: Michael Kohut, La Quinta, CA (US); Larry Goodman, Los Angeles, CA (US); Mark Koffman, Encino, CA (US); Jim Mercs, Huntington Beach, CA (US)

(73) Assignees: SONY CORPORATION, Tokyo (JP); SONY PICTURES ENTERTAINMENT INC, Culvery City, CA (US)

( * ) Notice: Subject to any disclaimer, the term of this patent is extended or adjusted under 35 U.S.C. 154(b) by 0 days.

(21) Appl. No.: 14/227,516

(22) Filed: Mar. 27, 2014

(65) Prior Publication Data

US 2014/0214907 A1     Jul. 31, 2014

Related U.S. Application Data

(62) Division of application No. 10/109,798, filed on Mar. 29, 2002, now abandoned.

(51) Int. Cl.
*G06F 17/30* (2006.01)
*G10L 17/00* (2013.01)

(52) U.S. Cl.
CPC .... *G06F 17/30091* (2013.01); *G06F 17/30244* (2013.01); *G10L 17/00* (2013.01)

(58) Field of Classification Search
CPC ................................................ G06F 17/30595
USPC ........................ 707/609, 687, 758, 781, 828
See application file for complete search history.

(56) References Cited

U.S. PATENT DOCUMENTS

| | | | |
|---|---|---|---|
| 4,716,458 | A | 12/1987 | Heitzman et al. |
| 4,970,666 | A | 11/1990 | Welsh et al. |
| 4,987,552 | A | 1/1991 | Nakamura et al. |
| 5,398,075 | A | 3/1995 | Freytag et al. |
| 5,457,370 | A | 10/1995 | Edwards et al. |

(Continued)

FOREIGN PATENT DOCUMENTS

WO          00/67867         11/2000

OTHER PUBLICATIONS

Jose Alvear Virage Adds Face Recognition Capabilities to VideoLogger Software, Feb. 9, 2000.*

(Continued)

*Primary Examiner* — Sana Al Hashemi
(74) *Attorney, Agent, or Firm* — Procopio, Cory, Hargreaves & Savitch, LLP

(57) ABSTRACT

A system and method for managing a plurality content items employs an ingest station which may digitize the content items, generate metadata corresponding to each of the content items, and store the metadata and the content items in a storage medium or mediums. The content items may be audio content, video content, or audio/video content. The system and method may provide an association between the metadata and a corresponding content item to facilitate retrieval of the content item. The content items may be retrieved, at least in part, by searching the metadata and employing the association between the metadata and a corresponding content item to locate the desired content item.

20 Claims, 5 Drawing Sheets

(56) References Cited

U.S. PATENT DOCUMENTS

| | | | |
|---|---|---|---|
| 5,469,560 A | 11/1995 | Beglin | |
| 5,577,188 A | 11/1996 | Zhu et al. | |
| 5,600,368 A | 2/1997 | Matthews et al. | |
| 5,610,653 A | 3/1997 | Abecassis et al. | |
| 5,673,401 A | 9/1997 | Volk et al. | |
| 5,689,442 A | 11/1997 | Swanson et al. | |
| 5,714,997 A | 2/1998 | Anderson | |
| 5,729,471 A | 3/1998 | Jain et al. | |
| 5,742,521 A | 4/1998 | Ellenby et al. | |
| 5,745,126 A | 4/1998 | Jain et al. | |
| 5,823,786 A | 10/1998 | Easterbrook | |
| 5,835,667 A | 11/1998 | Wactlar et al. | |
| 5,838,310 A | 11/1998 | Uya | |
| 5,850,232 A | 12/1998 | Engstrom et al. | |
| 5,860,862 A | 1/1999 | Junkin et al. | |
| 5,865,624 A | 2/1999 | Hayashigawa | |
| 5,878,174 A | 3/1999 | Stewart et al. | |
| 5,900,868 A | 5/1999 | Duhault et al. | |
| 5,966,132 A | 10/1999 | Kakizawa et al. | |
| 5,995,941 A | 11/1999 | Maguire et al. | |
| 6,031,545 A | 2/2000 | Ellenby et al. | |
| 6,044,397 A | 3/2000 | Eleftheriadis et al. | |
| 6,061,056 A | 5/2000 | Menard et al. | |
| 6,067,653 A | 5/2000 | Tsukagoshi | |
| 6,072,504 A | 6/2000 | Segen | |
| 6,080,063 A | 6/2000 | Khosla | |
| 6,133,962 A | 10/2000 | Proehl et al. | |
| 6,144,375 A | 11/2000 | Jain et al. | |
| 6,147,716 A | 11/2000 | Ohki et al. | |
| 6,148,280 A | 11/2000 | Kramer et al. | |
| 6,151,009 A | 11/2000 | Kanade et al. | |
| 6,159,016 A | 12/2000 | Lubell et al. | |
| 6,178,007 B1 | 1/2001 | Harrington | |
| 6,193,610 B1 | 2/2001 | Junkin | |
| 6,219,011 B1 | 4/2001 | Aloni et al. | |
| 6,229,550 B1 | 5/2001 | Gloudemans et al. | |
| 6,236,395 B1 | 5/2001 | Sezan et al. | |
| 6,260,040 B1 | 7/2001 | Kauffman et al. | |
| 6,266,100 B1 | 7/2001 | Gloudemans et al. | |
| 6,282,317 B1 | 8/2001 | Luo et al. | |
| 6,295,115 B1 | 9/2001 | Zhang et al. | |
| 6,330,486 B1 | 12/2001 | Padula | |
| 6,330,572 B1 | 12/2001 | Sitka | |
| 6,341,290 B1 | 1/2002 | Lombardo et al. | |
| 6,353,461 B1 | 3/2002 | Shore et al. | |
| 6,359,585 B1 | 3/2002 | Bechman et al. | |
| 6,366,914 B1 | 4/2002 | Stern | |
| 6,378,132 B1 | 4/2002 | Grandin et al. | |
| 6,384,871 B1 | 5/2002 | Wilf et al. | |
| 6,408,257 B1 | 6/2002 | Harrington et al. | |
| 6,414,696 B1 | 7/2002 | Ellenby et al. | |
| 6,415,280 B1 | 7/2002 | Farber et al. | |
| 6,445,815 B1 | 9/2002 | Sato | |
| 6,449,540 B1 | 9/2002 | Rayner | |
| 6,466,205 B2 | 10/2002 | Simpson et al. | |
| 6,466,275 B1 | 10/2002 | Honey et al. | |
| 6,484,199 B2 | 11/2002 | Eyal | |
| 6,486,523 B2 | 11/2002 | Tomomatsu | |
| 6,525,780 B1 | 2/2003 | Bruno et al. | |
| 6,535,114 B1 | 3/2003 | Suzuki et al. | |
| 6,535,226 B1 | 3/2003 | Sorokin et al. | |
| 6,537,076 B2 | 3/2003 | McNitt et al. | |
| 6,545,705 B1 | 4/2003 | Sigel et al. | |
| 6,571,054 B1 | 5/2003 | Tonomura et al. | |
| 6,571,193 B1 | 5/2003 | Unuma et al. | |
| 6,593,936 B1 | 7/2003 | Huang et al. | |
| 6,597,406 B2 | 7/2003 | Gloudemans et al. | |
| 6,640,217 B1 | 10/2003 | Scanlan et al. | |
| 6,642,939 B1 | 11/2003 | Vallone et al. | |
| 6,647,396 B2 | 11/2003 | Parnell et al. | |
| 6,674,461 B1 | 1/2004 | Klapman | |
| 6,681,395 B1 | 1/2004 | Nishi | |
| 6,707,456 B1 | 3/2004 | Marrin et al. | |
| 6,710,882 B2 | 3/2004 | Hasegawa | |
| 6,720,990 B1 | 4/2004 | Walker et al. | |
| 6,728,849 B2 | 4/2004 | Kodama | |
| 6,741,241 B1 | 5/2004 | Jaubert et al. | |
| 6,750,919 B1 | 6/2004 | Rosser | |
| 6,760,721 B1 | 7/2004 | Chasen et al. | |
| 6,760,916 B2 | 7/2004 | Holtz et al. | |
| 6,771,272 B2 | 8/2004 | Deering | |
| 6,778,085 B2 | 8/2004 | Faulkner et al. | |
| 6,778,978 B1 | 8/2004 | Lee | |
| 6,782,394 B1 * | 8/2004 | Landeck | G06F 17/30595 |
| 6,791,574 B2 | 9/2004 | Hoch et al. | |
| 6,792,321 B2 | 9/2004 | Sepe, Jr. | |
| 6,799,180 B1 | 9/2004 | McGrath et al. | |
| 6,810,397 B1 | 10/2004 | Qian et al. | |
| 6,825,875 B1 | 11/2004 | Strub et al. | |
| 6,833,865 B1 | 12/2004 | Fuller et al. | |
| 6,850,250 B2 | 2/2005 | Hoch | |
| 6,860,806 B2 | 3/2005 | Kojima | |
| 6,868,440 B1 | 3/2005 | Gupta et al. | |
| 6,882,793 B1 | 4/2005 | Fu et al. | |
| 6,961,954 B1 | 11/2005 | Maybury et al. | |
| 7,000,245 B1 | 2/2006 | Pierre et al. | |
| 7,065,250 B1 | 6/2006 | Lennon | |
| 7,120,586 B2 | 10/2006 | Loui et al. | |
| 7,184,959 B2 | 2/2007 | Gibbon et al. | |
| 7,305,384 B2 * | 12/2007 | Omoigui | G06F 17/30056 707/758 |
| 7,313,808 B1 | 12/2007 | Gupta et al. | |
| 7,369,130 B2 | 5/2008 | Kawabe et al. | |
| 7,673,321 B2 | 3/2010 | Yurt et al. | |
| 2001/0003715 A1 | 6/2001 | Jutzi | |
| 2001/0005218 A1 | 6/2001 | Gloudemans et al. | |
| 2001/0012324 A1 | 8/2001 | Normile | |
| 2001/0023202 A1 | 9/2001 | Okubo | |
| 2002/0010928 A1 | 1/2002 | Sahota | |
| 2002/0016971 A1 | 2/2002 | Berezowski et al. | |
| 2002/0024450 A1 | 2/2002 | Townsend et al. | |
| 2002/0027617 A1 | 3/2002 | Jeffers et al. | |
| 2002/0064764 A1 | 5/2002 | Fishman et al. | |
| 2002/0069218 A1 * | 6/2002 | Sull et al. | 707/501.1 |
| 2002/0069265 A1 | 6/2002 | Bountour et al. | |
| 2002/0115047 A1 | 8/2002 | McNitt et al. | |
| 2002/0152462 A1 | 10/2002 | Hoch et al. | |
| 2002/0170068 A1 | 11/2002 | Rafey et al. | |
| 2002/0178450 A1 | 11/2002 | Morita et al. | |
| 2002/0188943 A1 | 12/2002 | Freeman et al. | |
| 2003/0033318 A1 | 2/2003 | Carlbom et al. | |
| 2003/0038892 A1 | 2/2003 | Wang et al. | |
| 2003/0163457 A1 | 8/2003 | Yano et al. | |
| 2003/0169335 A1 | 9/2003 | Monroe | |
| 2004/0015441 A1 | 1/2004 | Ebihara et al. | |
| 2004/0107439 A1 | 6/2004 | Hassell et al. | |
| 2004/0170321 A1 | 9/2004 | Gong et al. | |
| 2005/0028194 A1 | 2/2005 | Elenbaas et al. | |

OTHER PUBLICATIONS

Rick Cavallaro, "The Fox Trax Hockey Puck Tracking System", Mar.-Apr. 1997, pp. 6-12.

\* cited by examiner

| DISPLAYED NAME | |
|---|---|
| Physical Assets | # of Channels |
| Asset Type | Channel Descriptor 1 |
| Asset Format | Channel Descriptor 2 |
| Partitioning Method | Originating Facility |
| Maximum # of Partitions | Barcode 1 |
| Partition # | Barcode 2 |
| Notes | Barcode 3 |
| Title | Sync system |
| Episodic | Bit Depth |
| Episode # | Sample Rate |
| Episode Title | Language |
| Version | Descriptor 1 |
| Version Qualifier | Descriptor 2 |
| Physical Condition | # of channels |
| Digital Assets | File Format |
| Tape Format | Software Version |
| Sub-tape Format | Run Time |
| Head Setup | Channel Descriptor 1 |
| Tape Speed | Channel Descriptor 2 |
| Sync System | Mixing Stage |
| Bit Depth | Crew |
| Sample Rate | Hard Drive Management |
| Language | Title |
| Descriptor 1 | Version |
| Descriptor 2 | Telescope Operator |
| Noise Reduction | Receiver (TS op) |
| Film/MAG Format | Check-out Date |
| Video Format | Check-in Date |
| Standard | Drive Size |
| Data Media | Drive Type |
| Recording Date | Drive Interface |
| Run Time | BARCODE |
| | Available |

FIG. 4

MEDIA MANAGEMENT SYSTEM AND PROCESS

CROSS-REFERENCES TO RELATED APPLICATIONS

The present application is a divisional application of co-pending U.S. patent application Ser. No. 10/109,798, filed Mar. 29, 2002. The disclosure of the above-referenced application is incorporated in its entirety herein.

BACKGROUND

1. Field of the Invention

The invention relates to a system and a method for managing media and, in particular embodiments, to a system and method for managing content items, such as, for example, audio content, by generating metadata related to a content item, storing the content item and the related metadata, and maintaining a virtual link between the content item and the related metadata so as to facilitate retrieval of the content item.

2. Related Art

Audio and visual content items may be stored in a variety of physical media including film, optical (CDs and DVDs), and magnetic. As used herein, the expression "content items" broadly and generally refers to information stored on a physical media. Examples of content items may include audio data, such as music, dialog, movie soundtracks, sound effects, or other like audio data. Examples of content items also may include visual data, such as video, including, but not limited to, movies, television programs, animation, home video, and the like. Examples of visual data may also include still images, such as pictures, a writing, charts, or other like images. Other like content items, including combinations of content items (e.g. audio and video data associated with a movie) may also be included. There are a variety of problems associated with conventional means for storing content items, including the possibility of (1) lost or misplaced content items; (2) deterioration of content items; (3) difficulty in locating and/or retrieving content items; and (4) information loss during production.

Content items may be lost or misplaced. Content items stored on a physical media may be difficult to locate after some time has passed. For example, in the case of movie audio, large amounts of audio data may be generated that ultimately is not mixed into a movie soundtrack. The audio data may be stored on magnetic tape, film, or computer disks. These physical media may be labeled and stored. However, the physical media may also be misplaced, mislabeled, or otherwise difficult to locate after some time has passed.

Content items stored on a physical media also may be subject to deterioration over time. This may be particularly problematic for content items stored in an analog format. For example, content items stored on magnetic tape or on film may be subject to deterioration. As such, someone desiring, for example, audio tracks from a movie that was created several years ago, may discover that the sound quality of the magnetic recordings is no longer satisfactory.

In addition, there may be difficulty in locating and accessing desired content items. For example, even if audio and/or video content items are stored on a physical media and archived, it may be difficult to locate or access the specific content items desired. Content items may be created and archived by multiple people, groups, or companies. As such, it may be difficult to identify where the desired content item is archived or stored. Also, once a physical media containing the desired content item is located, it may still need to be sent or delivered to an individual who desires access to the content item. Sending or delivering a physical media may be time intensive and inefficient.

Finally, content items may not be adequately archived or stored during the production of the content items. For example, in the case of movie audio, there may be multiple phases or stages of production of the audio that are never stored or archived. Actors may record their lines multiple times and on different tracks. These types of content items may be recorded over or discarded once the movie has been completed. Similarly, sound effects and background music may be added to a movie soundtrack in multiple phases. These content items may never be archived during production of the soundtrack, which may render the content unavailable in the future. Thus, many content items may never be adequately archived. Also, much information may be lost when it is not recorded during production. After a movie has been completed, for example, it may be difficult to discern who is speaking in a particular scene, how a particular sound effect was created, or other like information that may be readily available during the production of the movie audio data.

SUMMARY

Therefore, it is an advantage of embodiments of the invention that a system and method for managing media may result in media content being stored in conjunction with related metadata such that retrieval of the stored content may be facilitated.

It is an advantage of embodiments of the system and method for managing media that content items may be stored in a centralized location such that the content items may be less likely to be lost or misplaced. Embodiments of the invention may provide for the generation of metadata related to the content items, which may further facilitate locating a particular content item after some time has passed.

It is a further advantage of embodiments of the invention that content items stored on a physical media may be digitized by an ingest station and input into the system for storage. Digitized versions of the content items may not be as susceptible to deterioration over time as, for example, analog versions of media content. Thus, embodiments of the system and method advantageously solve a problem of deterioration of media content that may be associated with some physical media.

It is a further advantage of embodiments of the invention that there may be an improved ability to locate and retrieve content items. Metadata may be generated that is related to each content item managed. As used herein, "metadata" refers to data associated with a content item, such as, for example, an audio content item, that defines or describes information about the content item. In some embodiments, metadata may include a plurality of metadata fields. Each of the plurality of metadata fields may define a separate informational item about a content item. The metadata fields may contain information about the format of the content item, such as sample rate, bit depth, sync source, and the like. The metadata fields may also contain information about the content, such as movie title, actor information, genre, and the like. An association may be created to virtually link a content item to related metadata. Therefore, metadata or metadata files may be searched in order to locate a desired content item. A plurality of metadata fields may be employed to facilitate a search and retrieval process. Also, retrieval of the content items may be facilitated because each of the content items may have been digitized and stored electronically. As such, content items may be delivered electronically in a digital format, as opposed to a time intensive process of delivering content stored on a physical media.

It is yet another advantage of embodiments of the invention that media content may be archived during the production of the content. In embodiments of the invention, content items may be archived, and related metadata generated, during the production of the content. Thus, more content may be available. For example, in embodiments of the invention concerning movie audio, the movie audio data may be archived at regular intervals during its production so that multiple versions of the audio data may be available. Also, because the metadata may be generated during the production of the content items, the metadata may be highly accurate and it may contain more information than if it was created after production of the content. For example, when movie audio data is archived after a movie has been completed, some information about the audio data may no longer be available. After a movie has been completed, for example, it may be difficult to discern who is speaking in a particular scene, how a particular sound effect was created, or other like information that may be readily available during the production of the audio data.

Embodiments of the invention may comprise, for example, one or more ingest stations connected to a server with a database installed on it, and a connected storage medium controlled by storage software. The ingest stations may be employed to input and/or digitize content items and store them in the storage medium. The ingest stations may also be employed for the generation of metadata related to each content item stored in the storage medium. The metadata may be generated manually or automatically, and it may be stored in the database installed on the server. Virtual links between each stored content item and related metadata may also be stored in the database installed on the server.

In embodiments of the invention, ingest stations may also be employed for the retrieval of content items stored in the system. An ingest station may be employed to search metadata files for desired attributes, such as a particular movie, actor, quote, or other desired attributes. If metadata is located which contains the desired attributes, then the virtual links may be employed to locate and retrieve an associated content item.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

In the following, embodiments of the invention will be explained in further detail with reference to the drawings, in which:

FIG. 4 shows a table that includes a plurality of example metadata fields that may be employed in embodiments of the invention.

DETAILED DESCRIPTION

Figure 1:
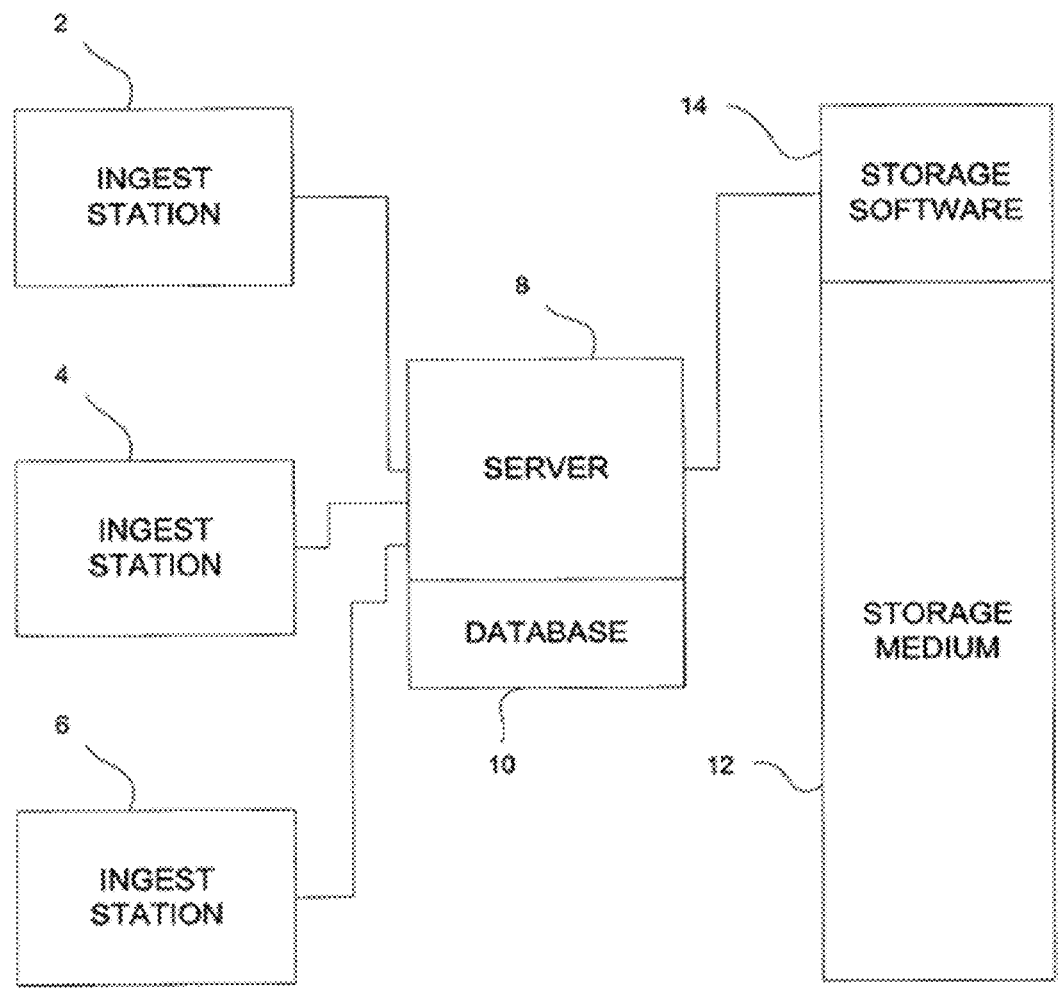
FIG. 1 is a block diagram illustrating an example hardware environment for embodiments of the invention.

The present invention provides a system and a method for managing and cataloging media, such as content items. In embodiments of the invention, metadata may be generated that corresponds to a particular content item. The metadata may include information about the corresponding content, such as subject matter, format, length, or other like information. The metadata may be generated when a content item is produced or created, or after a content item has been created. When metadata is generated in conjunction with the development or creation of a content item, the metadata may be highly accurate and may include information about the development of the particular content item.

In embodiments of the invention, the generation of metadata in conjunction with the development of content items may facilitate archiving and retrieval of the content items. Once a content item and related metadata have been generated, a coding system may be employed to relate a content item to specific metadata, or to a specific file of metadata. A content item may then be stored either with related metadata or apart from related metadata. A content item may then be retrieved by referencing or searching related metadata. In embodiments of the invention, content items may be stored in a centralized location so that they may be accessed by multiple users or from multiple remote locations, such as for example, by users in different cities or countries.

In some embodiments of the invention, the content items may be audio tracks or audio files associated with recorded video, such as, for example, audio associated with a movie. For example, a movie soundtrack may be treated as a single content item. In such embodiments, the system and process may be employed to manage a plurality of movie soundtracks. In other embodiments, a movie soundtrack may be divided into a plurality of smaller content items, or a plurality of audio files. A movie soundtrack may be divided, for example, based on scenes in the movie, lines of particular characters, fixed time intervals, or based on other manners of division.

In embodiments concerning audio files, metadata which relates to an audio file may be generated during the development of the audio file (i.e. during the development of a movie soundtrack). In such embodiments, audio files may be archived at various stages during their production, from pre-production to production to post-production. When a content item is archived, metadata may be generated which may include, for example, the title of a movie to which an audio file relates, the language of dialog in an audio file, the run-time of the audio file, version information, or other like attributes. Metadata related to a particular audio file may be stored in a file or table. An audio file may be virtually linked to a file or table containing related metadata by employing a coding mechanism.

In embodiments of the invention, by employing a coding mechanism, an audio file may be retrieved by reference to metadata related to the audio file. For example, in embodiments of the invention concerning movie audio, metadata may include information about a scene in a movie from which a particular audio file originated. In such embodiments, an audio file may be retrieved by searching metadata files for a particular movie scene. In other embodiments, metadata may include, for example, information about characters or actors whose voices are included in a particular audio file. In these embodiments, audio files that contain dialog by a particular movie character may be retrieved by searching the metadata for references to the particular character.

In other embodiments, the content items may be video content, such as video tracks, video files, or other video content. The content items may also be graphics, still photos, animation, or other visual content.

An example hardware environment of embodiments of the invention is illustrated in FIG. 1. The example hardware environment in FIG. 1 includes a plurality of ingest stations 2, 4, and 6; a server 8 with a database 10; and a storage medium 12 with storage software 14. Ingest stations 2-6 may be employed to obtain and digitize content items, such as, for example, audio data. Ingest stations 2-6 may also be employed for the addition or generation of metadata associated with particular content items.

An example hardware environment may employ a TeleScope Enterprise application and implementation provided by North Plains Systems Corporation, located in Mississauga, ON Canada. In such an embodiment, a TeleScope Database & Application Server may comprise a Sun E420R server, Oracle 8i software, and ADIC AMASS software. In this embodiment, the storage medium 12 may comprise an ADIC Scalar 1000. An ingest station 2-6 may comprise a TeleScope Windows Client with an Oracle ODBC driver and a Fibre NIC card. This example hardware environment is merely an example provided for illustrative purposes. Other suitable hardware environments may be employed with different servers (or without a server), different software applications, and different storage mediums. Indeed, suitable hardware environments may range in scale from a single personal computer to a large, distributed network, and the like.

In the example hardware environment of FIG. 1, ingest stations 2-6 are connected to a server 8, on which a database 10 is installed. In other embodiments, the database 10 may be located remote from the server 8 and be accessible by the server 8 through a suitable communication link. The database 10 may store information in a manner which provides virtual links between content items and related metadata or files of metadata. The relationships between content items and metadata may be stored, for example, in a look-up table format, or the relationships may be stored in another suitable manner.

In the example hardware environment in FIG. 1, the server 8 is connected to a storage medium 12, which is under the control of storage software 14. The storage medium 12 may store content items. The storage software 14 may control the retrieval of the content items stored in the storage medium 12.

The example hardware environment shown in FIG. 1, and the elements included therein, may be varied without straying from the scope or spirit of the invention. The ingest stations 2-6 may comprise workstations, terminals, personal computers, or other suitable devices that may be employed to obtain, and in some embodiments digitize, content items. An example ingest station is illustrated in FIG. 2.

Figure 2:
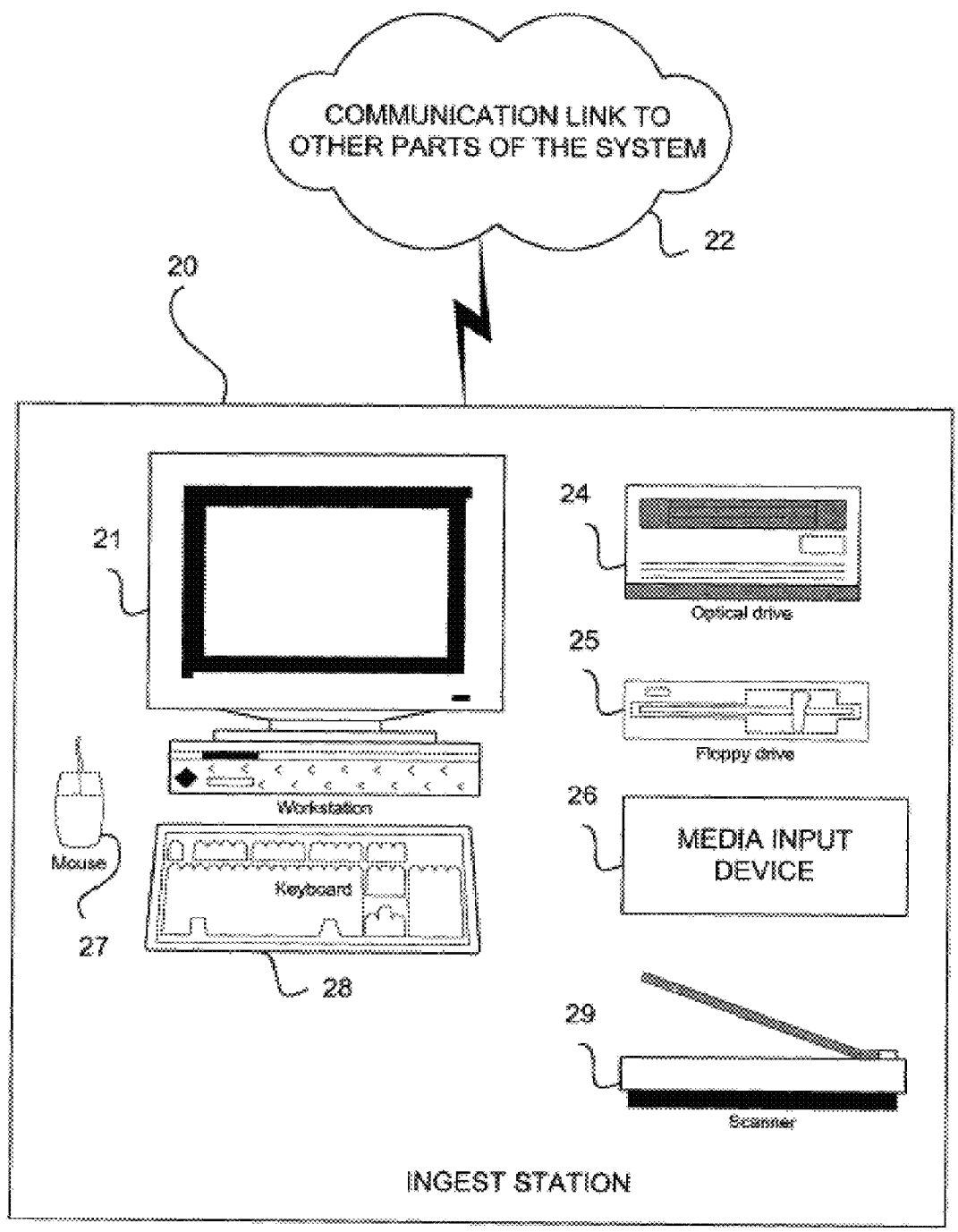
FIG. 2 is a representative view of an example ingest station that may be employed in embodiments of the invention.

The example ingest station 20 illustrated in FIG. 2 comprises a workstation 21 having a communication link 22 to other parts of the system (such as the server 8 shown in FIG. 1). The workstation shown in FIG. 2 includes an optical drive 24, a floppy drive 25, and a media input device 26, any of which may be employed to obtain, input, and/or digitize content items. The media input device 26 may comprise one or more media playing devices (not shown), such as an audio tape player, a videotape player, a film player/projector, or another suitable device or devices, connected to the workstation for inputting content items into the system. An ingest station may also include other input devices, such as a mouse 27, a keyboard 28, a scanner 29, and other suitable input devices, which an operator may employ to input metadata.

In FIG. 1, the server 8 allows for multiple ingest stations to be part of a single media management system. Other embodiments, however, may employ a single ingest station without a server. In such embodiments, a database may be installed, for example, in the ingest station. In further embodiments, multiple servers and multiple databases may be employed, either in a single location or in multiple locations.

In the example hardware environment in FIG. 1, the storage medium 12 stores the content items. The storage medium 12 may be any suitable storage device or devices, including, but not limited to, disk storage, tape storage, digital cartridge storage, or the like. The storage medium 12 may include a plurality of storage devices of the same type or of different types. In some embodiments, the storage medium 12 may comprise a mass storage facility comprising an array of storage media, such as disks or tapes. The storage medium 12 may be controlled by storage software 14. Storage software 14 may be employed for retrieving content items from the storage medium 12.

Next, a method for managing media according to embodiments of the invention will be described. An embodiment of the invention includes generating metadata during the production or creation of a content item (such as, for example, an audio content item), associating the generated metadata with the related content item, storing the content item and the related metadata, and retrieving the stored content item based at least in part on the metadata related to that content item. In an example embodiment of the invention, the content items being managed may include audio data from a movie or movies. However, embodiments of the invention may include other types of media or content, or audio content from sources other than movies, including, but not limited to, content from such sources as television programs, documentaries, educational or training programs, animated programs, graphical presentations, or the like.

In an example embodiment of the invention, metadata related to movie audio data may be generated during the production of the audio data. In embodiments of the invention, movie audio data may be produced or created in a conventional manner. For example, audio may be developed and recorded in either an analog or a digital format. Audio may be recorded on, for example, a CD/DVD, film, videotape or audiotape, a computer disk, or other suitable physical recording media. Also, audio data may be developed in multiple phases. For example, in the case of movie audio data, actors' voices may be added in a single phase or in multiple phases, sound effects may be added in a separate phase, and background music may be added in yet another phase. In addition, multiple voice tracks may be developed so that a movie may be released in multiple languages. Additional phases may also be employed. It is an advantage of embodiments of the invention that metadata may be generated that is related to audio that may be archived during multiple phases of development of a movie soundtrack.

For example, at selected intervals during the production or creation of movie audio data, audio data may be delivered to an ingest station for archiving and for metadata generation. The selected intervals may vary according to embodiments of the invention. For example, audio content may be archived daily, weekly, at the end of a recording session, at the time of completion of a particular scene or portion of a movie, or at another suitable or desired interval or combination of intervals. By selecting a more frequent interval, more information about the production of audio may be captured.

Figure 3:
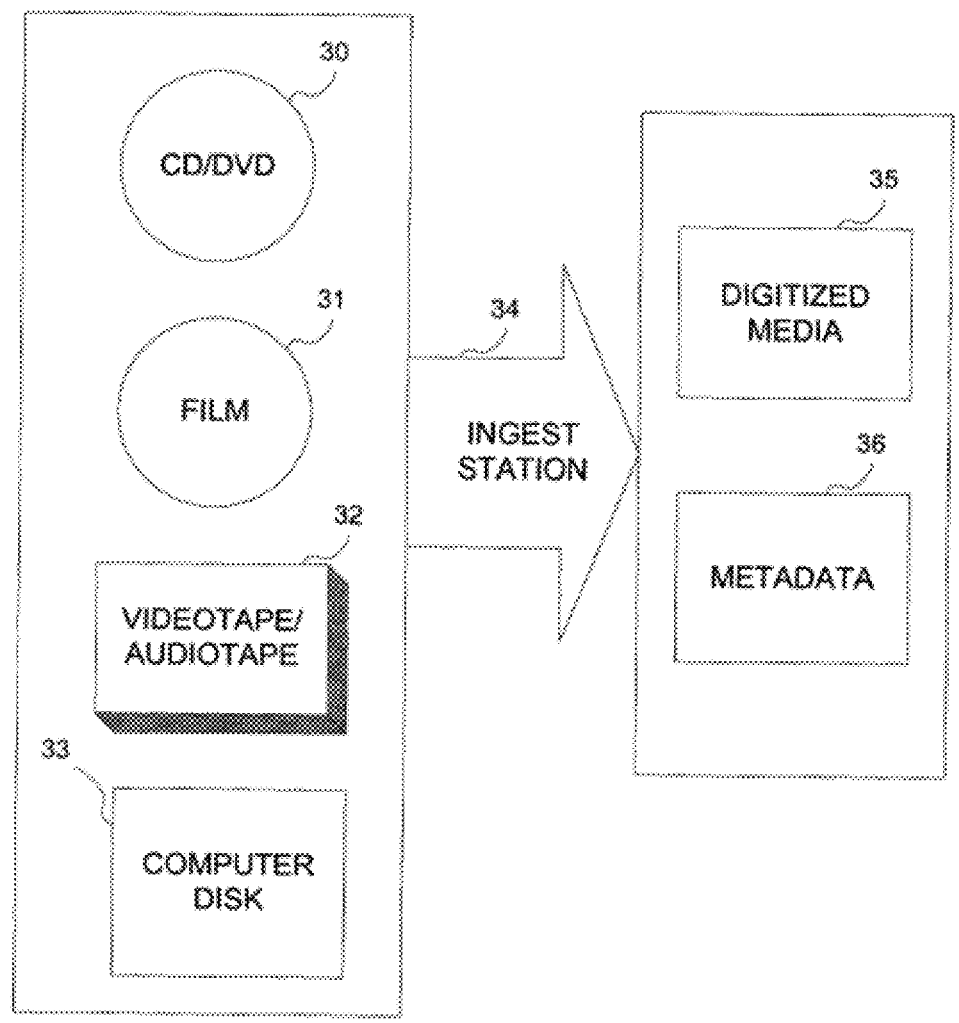
FIG. 3 is a diagram showing a portion of a function of an ingest station according to embodiments of the invention.

FIG. 3 illustrates a portion of a method, according to embodiments of the invention, for generating metadata during the production of, for example, audio for a movie. FIG. 3 shows that audio data may be recorded on a CD/DVD 30, film 31, a videotape or audiotape 32, a computer disk 33, or another suitable physical media. The audio data may have been recorded from a live presentation, copied from one or more previous recordings, or the like. At a selected interval, audio content may be presented to an ingest station in a process 34 in FIG. 3. When audio content is produced in a digital format, then the audio content may be input into an ingest station without being digitized. When audio content is created in an analog format, then an ingest station may be employed to digitize the audio content. Ultimately, a content item may be archived in the system as a digitized media item 35 and related metadata 36.

For example, an operator may employ an ingest station to digitize an audio file which is stored on a magnetic audiotape. In such an embodiment, an ingest station may include a personal computer connected to an audiotape player, through a suitable interface. In other embodiments, if an audio file is produced in a digital format, such as on a computer disk, then an operator may employ an ingest station to input the audio data into the system without a further step of digitizing the file. In further embodiments, ingest stations may automatically obtain content items, such as audio files, without the assistance of an operator. For example, an ingest station may include a workstation connected to the Internet or to a suitable network, which automatically obtains or receives audio files submitted or sent over the Internet or over a suitable network.

In an example embodiment illustrated in FIG. 3, an ingest station may be employed to both obtain audio content items and to generate related metadata. As discussed herein, "metadata" refers to data associated with a content item, such as, for example, an audio content item, which defines or describes information about the content item. In an example embodiment, metadata may include a plurality of metadata fields. Each of the plurality of metadata fields may define a separate informational item about a content item.

FIG. 4 shows an example metadata matrix including a plurality of metadata fields employed in one representative embodiment of the invention. The example metadata matrix shown in FIG. 4 includes data relating to a physical asset, data relating to a digital asset, and data relating to hard drive management. A "physical asset" refers to the physical media on which a content item (i.e. audio) was originally recorded and which may be stored (in addition to the digitized content being stored in the system). The "digital asset" fields include detailed information about a digitized version of a content item. These metadata fields may contain important format information such as sample rate, sync source, bit depth, and the like. The "hard drive management" fields may be employed in embodiments in which content items are archived on hard drives. Embodiments of the invention may employ suitable metadata fields other than or in addition to the metadata fields shown in FIG. 4. Example metadata fields for movie audio may include a movie title, a movie scene, a character, an actor, and other like data that may be descriptive of the audio content item.

In embodiments of the invention, an operator may input metadata into an ingest station or an ingest station may generate metadata automatically. For example, an operator may employ an ingest station as shown in FIG. 2 to manually fill in the metadata fields shown in FIG. 4. An operator may obtain information to place in the metadata fields by, in the case of audio content, for example, listening to the audio. An operator may also input information from a physical media on which an audio content item is recorded. For example, an audiotape may have a label with identifying information or format information that an operator may input as metadata. An operator may also scan such a label into the system so that an image of the label may be included as metadata. A label may describe, for example, the audio data format and whether an audio track is left channel, right channel, surround, or the like. Moreover, in embodiments in which metadata is generated during the production of the content items, an operator may query individuals involved in the production of the content about information that may be included as metadata. Other sources of information may also be available.

In further embodiments, an ingest station may generate metadata automatically. For example, an ingest station may divide a large audio file into a plurality of smaller audio files. In such embodiments, an ingest station may automatically populate certain metadata fields with information that describes the relationship of each of the smaller audio files to the original audio file. In some embodiments, an ingest station may recognize different voices and divide an audio file into a plurality of audio files, with each file containing dialog by a particular speaker.

In such embodiments, an ingest station may include voice-recognition software to determine where to divide a file. An ingest station may then populate metadata fields with appropriate data regarding the speaker, automatically. In such embodiments, an ingest station may run a program that causes the ingest station to perform these operations. For example, a program may cause an ingest station to scroll through an audio file, employing voice recognition software, and pause each time a new voice is recognized. The program may then cause an ingest station to divide the audio file into two files, and then continue to scroll through the remainder of the original file. Each time an audio file is split, the portion which has been scrolled through may be stored as a separate file and metadata fields corresponding to the separate file may be populated with information ascertained by, for example, voice recognition software. In other embodiments, an operator may be prompted to enter metadata at appropriate times.

In other embodiments, an ingest station may automatically insert a time and date of archive into metadata fields. In such embodiments, an ingest station may have a program that causes the ingest station to read time and date data from an internal clock and input that information into automatically generated metadata fields. Other types of metadata may be generated automatically by an ingest station without deviating from the scope and spirit of the invention.

Figure 5:
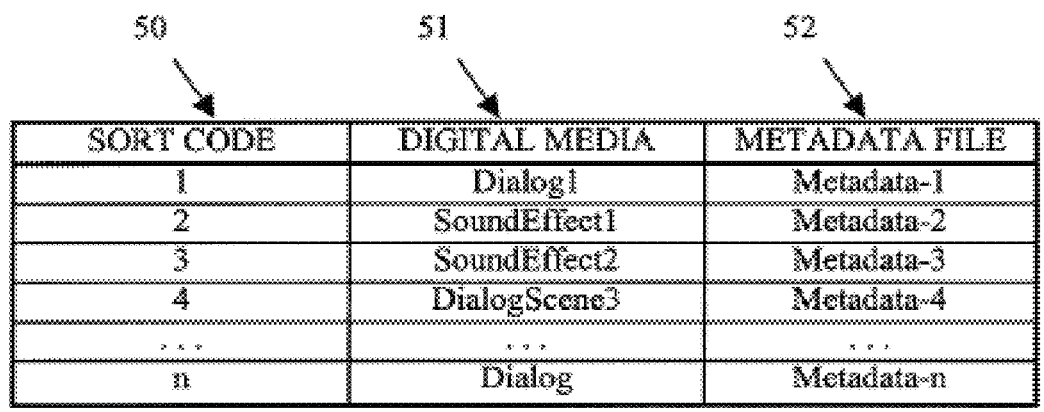
FIG. 5 shows a table which may be employed in embodiments of the invention to manage virtual links between digital media and metadata.

After an ingest station has been employed to input and/or digitize a content item, and related metadata has been generated, then a virtual link may be established between the metadata and the content item. An example of a virtual link is shown in FIG. 5. FIG. 5 shows a three-column table which includes a column 50 for a sort code, a column 52 for a name of a digital asset, and a column 54 for a name of a metadata file. The sort code virtually links a content item to a related metadata file. Thus, the sort code facilitates retrieval of a content item with reference to the related metadata file. For example, referring to FIG. 5, if a search for a particular sound effect reveals a description of that sound effect in metadata file Metadata-2, then the sort code (2) virtually links the metadata file Metadata-2 to digital media file SoundEffect1. Further examples of locating content items by searching metadata files are provided below. Embodiments of the invention may employ other means of virtually linking stored content items to metadata files. In further embodiments, a virtual link may not be employed at all where, for example, content items are stored together with related metadata files.

In embodiments of the invention, a media management system stores content items, metadata related to content items, and virtual links between them. In an example hardware environment shown in FIG. 1, content items may be stored in a storage medium 12. Metadata files may be stored in a database 10. Virtual links between content items and metadata files may also be stored in the database 10. In further embodiments, metadata and content items may be stored together in a database or in a storage medium, or another suitable storage arrangement may be employed.

In embodiments of the invention, once a content item has been digitized and stored and a virtual link has been established between the content item and related metadata, then retrieval of the content item may be facilitated. In embodiments of the invention, stored content items may be retrieved by employing an ingest station or content items may be retrieved from a remote location. In either embodiment, retrieval of a content item may be accomplished by searching metadata files. The complexity of the search available may be dependent on the complexity of the metadata. For example, in embodiments of the invention, content items may include entire movie soundtracks. In such embodiments, metadata files may include information about the movie soundtracks, such as the name of the movie, actors appearing in the movie, the movie genre, the year in which the movie was made or released, or other like information. In such embodiments, a search may be conducted for a movie soundtrack that includes a particular actor appearing in a movie in a particular year. For example, a metadata file related to the movie soundtrack for "Jerry Maguire" may include the following example fields:

1 Movie Title Jerry Maguire Year Movie Made 1996 Directed By Cameron Crowe Actresses Include Renee Zellweger Kelly Preston Actors Include Tom Cruise Cuba Gooding, Jr. Jonathan Lipnicki Characters Jerry Maguire Rod Tidwell Dorothy Boyd Avery Bishop Ray Boyd Subjects Sports Football Romantic Comedy Audio Format 5.1 Discrete 8-Channel Audio Discrete 2-Track Stereo Mono Notable Quotes "Show me the money." "You had me at 'hello.'"

In this example embodiment, a search may include a single search parameter of 'Movie Title=Jerry Maguire' to return the soundtrack for the movie "Jerry Maguire." One could also search for the "Jerry Maguire" soundtrack recorded in a particular format by employing multiple search parameters, such as 'Movie Title=Jerry Maguire' and 'Audio Format=2 Track Stereo.'

Similarly, in the above example, a search including the search parameters 'Year Movie Made=1996' and 'Actors Include=Tom Cruise' may also yield the soundtrack for the movie "Jerry Maguire." Also, a search for a movie soundtrack which includes search parameters of 'Actors Include=Cuba Gooding, Jr.' and 'Notable Quotes="Show me the money."' may yield the soundtrack for the movie "Jerry Maguire." Accordingly, by relating metadata to a content item, such a movie soundtrack, retrieval of the content item may be facilitated. In the example above, one may retrieve the soundtrack for the movie "Jerry Maguire" even if their only recollection of the movie was that a character played by Cuba Gooding, Jr. said "Show me the money" or that a character played by Renee Zellweger said, "You had me at 'hello.'"

The example metadata fields shown above relating to "Jerry Maguire" are merely examples included for illustrative purposes. Embodiments of the invention may include fewer metadata fields, different metadata fields, or more metadata fields. The more rich and complex generated metadata is, the more flexible embodiments of a retrieval function may be. Generally, a retrieval function in embodiments of the invention may be made more complex by including greater amounts of metadata with respect to each stored content item.

In further embodiments of the invention, the content items may include portions of a movie soundtrack. In such embodiments, metadata associated with the portions of a movie soundtrack (content items) may include information pertaining to where the portions of the soundtrack fit into the movie, the subject matter of the particular content item, or other like information. For example, a content item may include only the portion of the "Jerry Maguire" soundtrack in which the character played by Cuba Gooding, Jr. utters the phrase, "Show me the money." Metadata associated with this content item may identify from which movie scene the content item originated, other characters present during the scene, other dialog that is part of this content item, or other like information. In such embodiments, a soundtrack of a movie, for example, may be archived as a plurality of smaller content items, with each content item having related metadata.

For example, in some embodiments, each sentence or phrase of dialog in a movie may be archived as a separate content item. Similarly, each sound effect in a movie may be archived as a separate content item. In such embodiments, one may locate a particular content item more quickly than in an embodiment in which an entire movie soundtrack is archived as a single content item. One may retrieve, for example, a single quote as discussed above. However, one may also retrieve multiple portions of a movie soundtrack with an appropriate search. In embodiments in which, for example, the soundtrack for "Jerry Maguire" is stored as a plurality of audio content items, a search with parameters of 'Actors Include=Tom Cruise' and 'Movie Title=Jerry Maguire' may yield content items that include all of the dialog spoken by Tom Cruise in the movie Jerry Maguire. Similarly, an appropriate search may yield a plurality of content items that include an entire conversation from a movie or the dialog of an entire movie scene.

In further embodiments of the invention, because metadata may be generated during the production of the content items, the metadata may also include information about the production of the content itself. In an example embodiment in which the content items include movie audio data, multiple versions of the audio data may be archived with metadata containing information about the multiple versions. For example, during the production of the audio for the movie "Jerry Maguire," the expression, "Show me the money" may have been recorded several times for a particular scene even though only one version ultimately was mixed into the movie. During production, each of the versions may be archived separately with related metadata generated to describe the various versions. In such an embodiment, a rich collection of audio data may be available such that a movie or a portion of a movie may be re-mixed. Other embodiments of the invention may employ archiving different versions of audio data for a movie so that the audio data may be re-mixed to omit profanity, to provide dialog in a different language, or for other like purposes.

Also, in embodiments of the invention in which metadata may be generated during the production of a content item, such as during the production of movie audio, metadata may be more detailed and more accurate than where metadata is generated after production has been completed. For example, each actor, or other people in a movie scene (e.g. extras), may be observed or queried for information, such as name, age, height, eye color, and other like information. Similarly, those producing the audio may be observed or queried for information about the production, such as, for example, how a particular sound effect was generated, or other like information. When metadata is generated after production of a content item has been completed, such as, for example, by listening to movie audio or watching a movie, some of the these sources of information may be unavailable.

Although example embodiments discussed above concern audio data from the movie "Jerry Maguire" for purposes of illustration, embodiments of the invention may include content items, such as audio data, from a variety of sources, such as other movies, television programs, pilots, commercials, or other like sources of audio data. In such embodiments, a search of all metadata files for information about a particular actor may yield audio content from movies in which the actor has appeared, as well as from television programs, commercials, and other sources of archived audio data pertaining to the particular actor. Similarly, depending on the richness of the metadata generated, a search of all metadata files for information about 'teacher' or 'doctor' characters, for example, may yield audio data from a plurality of movies, television shows, and the like, of teacher or doctor characters. Such a collection of audio data may be of great value to someone who is casting, for example, a teacher or a doctor.

Further embodiments of the invention may include other types of content items. For example, although example embodiments discussed above include audio data as the content items, video data or a combination of audio data and video data may comprise the content items. In an example embodiment, a feature film may be divided into a plurality of video content items, with or without associated audio content. In such an embodiment, metadata may be generated that describes the production or content of a particular video content item. Accordingly, metadata may be searched to locate video content items showing, for example, city scenes. In further embodiments, more detailed metadata may be searched to locate video content items showing a particular city, such as New York City, or a particular actor in a particular city, such as Tom Cruise in New York City. Further embodiments may include other types of video content or other combinations of audio/video content.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

The invention claimed is:

1. A method for managing a plurality of content items comprising:
   automatically generating metadata corresponding to at least one content item of the plurality of content items when the at least one content item is copied for archiving,
   wherein the metadata comprises metadata matrix including information about the at least one content item and a format of the at least one content item, the format including sample rate, bit depth, and sync source;
   archiving the at least one content item;
   linking the metadata with the at least one content item using a virtual link including sort codes,
   wherein the sort codes enable the virtual link of the metadata with the at least on content item to be sorted; and
   storing the linked metadata and the virtual link for retrieval of the at least one content item.

2. The method for managing a plurality of content items according to claim 1, further comprising
   retrieving the at least one content item using the sort codes of the virtual link.

3. The method for managing a plurality of content items according to claim 1,
   wherein the plurality of content items includes a plurality of audio content items;
   wherein the plurality of audio content items comprises multiple versions of at least one of the plurality of audio content items; and
   wherein at least two of the multiple versions were produced from a non-recorded source at different times.

4. The method for managing a plurality of content items according to claim 1,
   wherein the plurality of content items includes a plurality of audio content items; and
   wherein archiving the at least one content item comprises automatically dividing each of the at least one of the plurality of audio content items into a plurality of smaller audio content items.

5. The method for managing a plurality of content items according to claim 4, further comprising
   automatically populating fields of the metadata corresponding to each of the at least one of the plurality of audio content items that have been divided with information that describes the relationship of the each of the plurality of smaller audio content items to the each of the at least one of the plurality of audio content items.

6. The method for managing a plurality of content items according to claim 1, wherein automatically generating metadata corresponding to each of the at least one content item of the plurality of content items when the at least one content item is copied for archiving comprises
   applying voice recognition processing to each of the at least one content item to generate additional archive data.

7. The method for managing a plurality of content items according to claim 6, further comprising
   automatically generating additional metadata corresponding to the generated additional archive data.

8. A system for managing a plurality of content items comprising:
   at least one ingest station for inputting a plurality of content items and metadata corresponding to each of the plurality of content items generated when each of the plurality of content items is copied for archiving, the at least one ingest station configured to link the metadata with at least one content item of the plurality of content items using a virtual link including sort codes,
   wherein the sort codes enable the virtual link of the metadata the at least o content item to be sorted,
   wherein the metadata comprises metadata matrix including information about the at least one content item and a format of the at least one content item, the format including sample rate, bit depth, and sync source;
   a first storage medium for archiving the plurality of content items;
   a second storage medium for storing the linked metadata and the virtual link for retrieval of each of the plurality of content items.

9. The system for managing a plurality of content items according to claim 8, further comprising
   a device for retrieving the at least one content item using the sort codes of the virtual link.

10. The system for managing a plurality of content items according to claim 8,
    wherein the plurality of content items includes a plurality of audio content items;
    wherein the plurality of audio content items comprises multiple versions of at least one of the plurality of audio content items; and
    wherein at least two of the multiple versions were produced from a non-recorded source at different times.

11. The system for managing a plurality of content items according to claim 8,
    wherein the plurality of content items includes a plurality of audio content items; and wherein the at least one ingest station comprises a device for automatically dividing each of the plurality of audio content items into a plurality of smaller audio content items.

12. The system for managing a plurality of content items according to claim 11, wherein the device for automatically dividing each of the plurality of audio content items into a plurality of smaller audio content items comprises
a device for automatically populating fields of the metadata corresponding to each of the plurality of audio content items that have been divided with information that describes the relationship of the each of the plurality of smaller audio content items to the each of the plurality of audio content items.

13. The system for managing a plurality of content items according to claim 8, wherein the at least one ingest station further comprises
a device for applying voice recognition processing to each of the plurality of content items to generate additional archive data.

14. The system for managing a plurality of content items according to claim 13, wherein the at least one ingest station further comprises
a device for automatically generating additional metadata corresponding to the generated additional archive data.

15. A method for managing a plurality of content items comprising:
identifying at least one content item for copying;
copying the at least one content item;
generating metadata corresponding to the at least one content item when the at least one content item is copied,
wherein the metadata comprises metadata matrix including information about the at least one content item and a format of the at least one content item, the format including sample rate, bit depth, and sync source;
linking the metadata with the at least one content item using a virtual link including sort codes,
wherein the sort codes enable e virtual link of the metadata with the at least one content tem to be sorted; and
storing the at least one content item along with the linked metadata and the virtual link for later retrieval of the at least one content item using sort codes of the virtual link.

16. The method of claim 15, wherein the at least one content item comprises
at least one scene of a movie recorded as at least one movie data.

17. The method of claim 16, further comprising
automatically generating additional metadata using a voice recognition processing applied to the at least one movie data to identify actors in the at least one scene.

18. The method of claim 17, further comprising
linking the additional metadata to the at least one movie data.

19. The method of claim 15, wherein generating the metadata corresponding to the at least one content item when the at least one content item is copied further comprises
generating the metadata when a content item is produced or created, or after the content item has been created.

20. The method of claim 15, wherein the generated metadata includes at least one of the title of a movie to which an audio file relates, a language of dialog in the audio file, a run-time of the audio file, and version information.

\* \* \* \* \*